Jan. 5, 1926.

A. P. McKAY 1,568,897

COMBINATION WEIGHT AND DEPTH GAUGE

Filed April 28, 1925

INVENTOR
Augusta P. McKay
BY Wilkinson & Giusta
ATTORNEYS.

Patented Jan. 5, 1926.

1,568,897

UNITED STATES PATENT OFFICE.

AUGUSTA POSTELLE McKAY, OF ROME, GEORGIA, ASSIGNOR TO TOWERS & SULLIVAN MANUFACTURING CO., OF ROME, GEORGIA, A CORPORATION OF GEORGIA.

COMBINATION WEIGHT AND DEPTH GAUGE.

Application filed April 28, 1925. Serial No. 26,458.

*To all whom it may concern:*

Be it known that I, AUGUSTA P. McKAY, a citizen of the United States, residing at Rome, in the county of Floyd and State of Georgia, have invented certain new and useful Improvements in Combination Weight and Depth Gauges, of which the following is a specification.

The present invention relates to improvements in combination weight and depth gauge for disc plows, harrows and cultivators and has for an object to provide a weighted cylinder made in two or more sections adapted to fit about the spacing spool between the discs in order to add substantial weight to the discs for the purpose of insuring the desired depth of penetration, particularly when hard soil conditions are encountered, and also to force the discs to cut through thick mats of small roots or to cut off large roots such as are frequently encountered in freshly cleared land or new ground.

It is a further object of the invention to provide a weight cylinder of substantial diameter with an outer, smooth extensive peripheral surface adapted to come in contact with the ground whereby to support the weight of the harrow in soft soil.

The invention further consists in having the weight cylinder made in two or more parts in order that it may be fitted about the spacing spool and secured thereto without the necessity for removing the spacing spool or either or both the discs.

The invention further contemplates the use of an improved scraper blade to cooperate not only with the discs, but also with the wide peripheral surface of the weight cylinder.

With the above and other objects in view, which will appear as the description proceeds, the invention consists in the novel details of construction and combinations and arrangements of parts, more fully and hereinafter described and particularly pointed out in the appended claims.

Referring to the accompanying drawings, forming a part of this specification, in which like numerals designate like parts in all the views.

Figure 3:
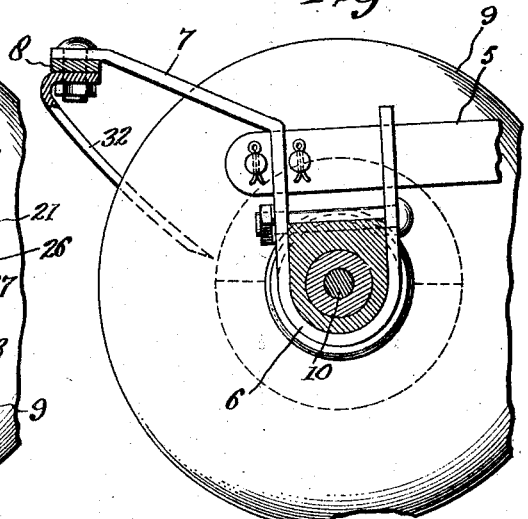
Figure 3 is a similar view taken on the line 3—3 also in Figure 1.

Referring more particularly to the drawings, 4 designates generally the frame of the harrow, and 5 the draw bar which is coupled to the various discs as by the U-bar 6. This U-bar is shown in Figure 3 as extended rearwardly, providing a supporting arm 7 for the scraper bar 8, which runs transversely at the rear portion of the harrow and supports the various scraper blades.

The discs are indicated at 9, the shaft or axle at 10, and the spacing spools at 11.

Figure 1:
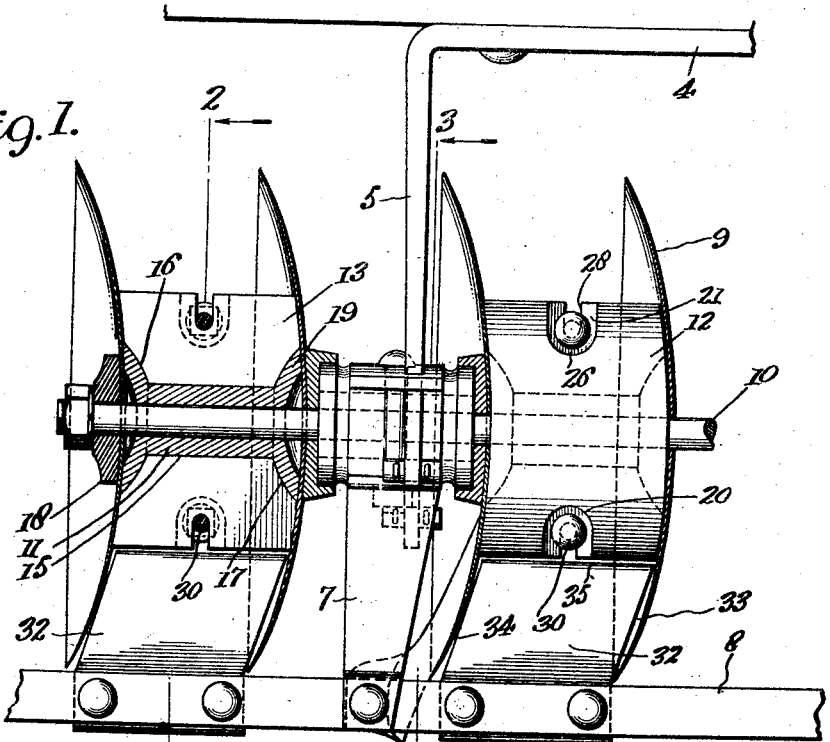
Figure 1 is a top plan view with the top shown in section of the portion of a harrow showing the invention applied thereto.

The invention consists in providing a cylinder made up of two or more sections, for instance, the two sections 12 and 13 shown in the drawings, these cylinders being half cylindrical sections provided with the semi-cylindrical depressions 14 and 15, being complements of one another and adapted to fit about the spacing spool 11. The end portions of the cylindrical depressions 14 and 15 are flared or cut away as indicated at 16 and 17 for the purpose of conforming to the heads 18 and 19 of the spacing spool 11. This arrangement prevents the weight cylinder from shifting axially and maintains the alinement of the peripheral surface thereof, which is of extensive area, being preferably the maximum area obtainable between adjacent discs 9. Inasmuch as the weight cylinder is made in two sections, it can be fitted and clamped about the spool 11 without the necessity for removing the spool or any of the discs, and it enables the weight cylinder to be used with spools having integral enlarged heads 18 and 19. The continuity of the peripheral surface of the weight cylinder is preserved as much as possible, while at the same time provision being made for the uniting of the two half sections 12 and 13 of the cylinder by simple means. In this connection, the cylinder section 12 is provided with narrow slots 20 and 21 adapted to oppose similar slots 22 and 23 in the section 13. These slots open out on the peripheries of the drum or cylinder only for a relatively short circumferential length and for a very narrow axial width. The walls 24 and 25 are substantially L-shaped, and the side walls are approximately vertical. Upstanding lugs 26 and 27 are provided, which extend in substantially a radial direction and abut when the half section of the cylinder are brought together. These lugs are U-shaped as shown at the right hand side of Figure 1, extending between the vertical walls and above the base wall of the slots. Notches 28 are made in the lugs 26 and 27, which notches also open out on the periphery of the drum or cylinder and are of a width to snugly receive the shanks 29 of the bolts used to secure the cylindrical sections together. The heads 30 of the bolts, and the nuts 31 screwed thereon, are of a width to take against the opposite outer faces of the lugs 26 and 27 while such heads and nuts are confined well within the circumference of the drum and are housed within the slots 20, 22. A very slight amount of earth will pack in the slots, and this will give a continuous peripheral surface, but this earth may be easily pried out of the slots when access is to be had to the bolts therein.

Figure 2:
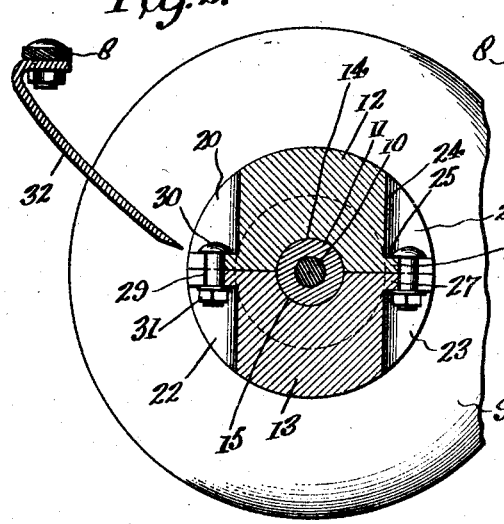
Figure 2 is a transverse section taken on the line 2—2 in Figure 1.

The improved scraper blades are shown at 32, having the side edges 33 and 34 disposed adjacent to the side surface of the discs 9 and having the inner edge 35 pointed as indicated in Figure 2 and disposed in slightly spaced relation from the peripheral surface from the drum or weight cylinder. The blade is preferably curved as indicated in Figure 2, and is supported from the scraper bar 8. The blade is also preferably disposed at the rear of the weight cylinder and just above a horizontal plane passing through the center thereof. The earth adhering to the surface of the cylinder will thus be removed as soon as the portion of the cylinder carrying the same has left the ground, and the scraper blade does not interfere with the weight cylinder itself, penetrating to a considerable extent into the ground.

In the use of the device, one or more of the weight cylinders may be attached or removed without changing any part of the harrow or removing the discs in order to put the weights on. The weights are not used as spacing spools, but are entirely separate structurally from the spacing spools, and do not serve the function of spacing the discs, but weights may be removed without causing collapse of the disc The scraper blade 32 scrapes the convex side of one disc and the concave side of the adjacent disc as well as scraping the surface of the weight cylinder.

While one form of the invention has been illustrated and described, it is obvious that those skilled in the art may vary the details of construction as well as the precise arrangement of parts, without departing from the spirit of the invention, and therefore, it is not wished to be limited to the above disclosure except as may be required by the claims.

What is claimed is:

1. In a harrow having spaced discs with a spacing spool therebetween, a weight cylinder composed of a plurality of sections fitting about said spacing spool and between said discs, and means to removably unite the sections of the weight cylinder.

2. In combination with a harrow having discs and a flanged spacing spool, of a weight cylinder composed of a plurality of sections having semi-cylindrical central depressions with flared ends adapted to fit about said spacing spool and the flanges thereof, and means to removably secure the sections of the cylinder about said spacing spool.

3. In combination with a harrow having discs and a spacing spool, of a weight cylinder composed of a plurality of sections having slotted adjoining peripheral parts with notched lugs therein, and fastening means seated in said slots and in the notches between said lugs and engaging opposite faces of said lugs to hold the sections of the cylinder about said spacing sleeve.

4. In a harrow having discs and a spacing sleeve between the discs, a weight cylinder composed of a plurality of sections having complemental depressions centrally therein for removably fitting about the spacing spool, said sections also having adjacent substantially L-shaped peripheral slots with substantially U-shaped notched lugs in the slots adapted to butt against one another, head bolts having shanks adapted to fit snugly in said notches, the heads adapted to take against one outer wall of said lugs, and nuts on the bolts adapted to take against the outer wall of the adjacent lugs.

AUGUSTA POSTELLE McKAY.